INVENTORS
ERIC METCALF
ANTHONY J. LEY

INVENTORS
ERIC METCALF
ANTHONY J. LEY

United States Patent Office 3,564,407
Patented Feb. 16, 1971

3,564,407
APPARATUS FOR MEASURING THE MEAN SQUARE VALUE OF AN ELECTRICAL SIGNAL FROM SAMPLED SIGNAL MAGNITUDES
Eric Metcalf and Anthony John Ley, Farnborough, England, assignors to The Solartron Electronic Group Ltd., Farnborough, England
Filed Jan. 17, 1967, Ser. No. 609,831
Claims priority, application Great Britain, Jan. 18, 1966, 2,377/66
Int. Cl. G01r 15/10, 17/06
U.S. Cl. 324—120                                    9 Claims

ABSTRACT OF THE DISCLOSURE

A voltmeter for measuring the root mean square or mean square amplitude of a voltage includes an input amplifier of high input impedance and low output impedance, the input of which is to be connected to the signal being measured. The instantaneous voltage of the output of the amplifier is sampled at discrete times and a series of signals are produced whose heights and lengths are both proportional to the voltage of the signal being measured. The signals produced after sampling, are triangular pulses and, more specifically, are triangular pulses of right-angled triangle configuration. The series of signals is converted into a pulse waveform consisting of a series of pulses of the same polarity with each pulse having an area proportional to the square of the amplitude of the signal from which it was formed. An integrator receives the pulses forming the pulse waveform and a signal derived from its own output so as to provide a D.C. voltage output which is either proportional to the mean area underneath the waveform and, hence, to the mean square value of the voltage of the signal being measured, or, by sampling the integrator output signal in a manner similar to that used after the input amplifier, proportional to the root of the mean area underneath the waveform and to the root mean square of the voltage of the signal being measured.

---

The present invention relates generally to analog voltmeters and, more specifically, to voltmeters which are used to measure the mean square, or the root mean square, value of a voltage.

Typical prior art root mean square (R.M.S.) voltmeters measure an R.M.S. voltage by measuring the thermal effect of the current produced by the voltage in a thermal device such as a thermocouple. Such meters are not only subject to errors due to variations of ambient temperature but they have a limited range of frequency, of which the lower frequency limit is determined by the mass of the thermal part of the thermocouple.

One form of meter which does not depend upon thermal effects is, for example, described in U.S. patent application No. 447,154, filed Apr. 12, 1965, and assigned to the assignee of the present invention.

According to the present invention, there is provided a voltmeter for measuring the root mean square or the mean square value of a voltage. One embodiment of a voltmeter according to the invention includes an input amplifier of high input impedance and low output impedance, the input of which is to be connected to the signal being measured. The instantaneous voltage of the output of the amplifier is sampled at discrete times and a series of signals are produced whose heights and lengths are both proportional to the voltage of the signal being measured. The signals produced after sampling, are triangular pulses and, more specifically, are triangular pulses of right-angled triangle configuration. The series of signals is converted into a pulse waveform consisting of a series of pulses of the same polarity with each pulse having an area proportional to the square of the amplitude of the signal from which it was formed. An integrator receives the pulses forming the pulse waveform and a signal derived from its own output so as to provide a D.C. voltage output which is either proportional to the mean area underneath the waveform and, hence, to the mean square value of the voltage of the signal being measured, or, by sampling the integrator output signal in a manner similar to that used after the input amplifier, proportional to the root of the mean area underneath the waveform and to the root mean square of the voltage of the signal being measured.

The integrator may be used in conjunction with a function generator of the type described in British patent specification No. 1,050,145, in which, before being fed into the integrator, the signal is divided by the time which has elapsed after a given instant of time.

The integrator may include an operational amplifier having a high negative gain. The output voltage of the integrator may be sampled at discrete times at the same mean frequency of sampling of the output voltage of the input amplifier to produce a series of feedback signals whose heights and lengths are proportional to the output voltage of the integrator. By feeding back the signals formed into the integrator, the voltage recorded as the output voltage of the integrator will be the R.M.S. voltage of the signal being measured and will be independent of the sampling frequency, because of the negative feedback of the operational amplifier being opposite and almost equal to its input.

The output voltage will only represent the voltage to be measured if the frequency of sampling is incoherent with the frequency of the waveform of the signal whose voltage is being measured.

Incoherence between the frequency of sampling and the frequency of the signal whose voltage is being measured may be ensured by varying the sampling frequency.

The signals produced by sampling of the output voltage of the integrator may be right-angled triangles whose slopes are proportional to the output voltage which, as a result of this feedback, will then be proportional to the mean square value of the voltage of the input waveform, and will be independent of the sampling frequency.

The slopes of both the series of signals produced may be made proportional to the output voltage which, as a result of this feedback, will then be proportional to the root mean square value of the original input waveform and will be independent of the sampling frequency.

The first part of the voltmeter of any of the forms already stated, being that part which produces a voltage waveform consisting of a series of pulses proportional in both length and height, to the instantaneous value of the voltage of the input signal and may be isolated from ground in which case the information contained in the waveform may be transferred from the first part of the voltmeter to the second part which may be grounded by an isolating transformer in a form which can be transmitted by such a transformer, such as in the form of pulses. This modification may be used with any of the previously stated forms of the voltmeter.

For a better understanding of the present invention, together with other and further objects thereof, reference may be had to the following description taken in connection with the accompanying drawings, the scope of the invention being pointed out in the appended claims.

A first embodiment of the invention will now be described with reference to FIG. 3.

The input voltage $V_i$, the value of which is to be measured, is supplied to an isolating amplifier 10 which has a high input impedance and a low output impedance. At discrete time intervals a sampler 11 transmits the output of the amplifier 10 to a triangulator 12 which produces a triangular pulse, proportional in area to the square of the instantaneous input voltage.

Figure 1:
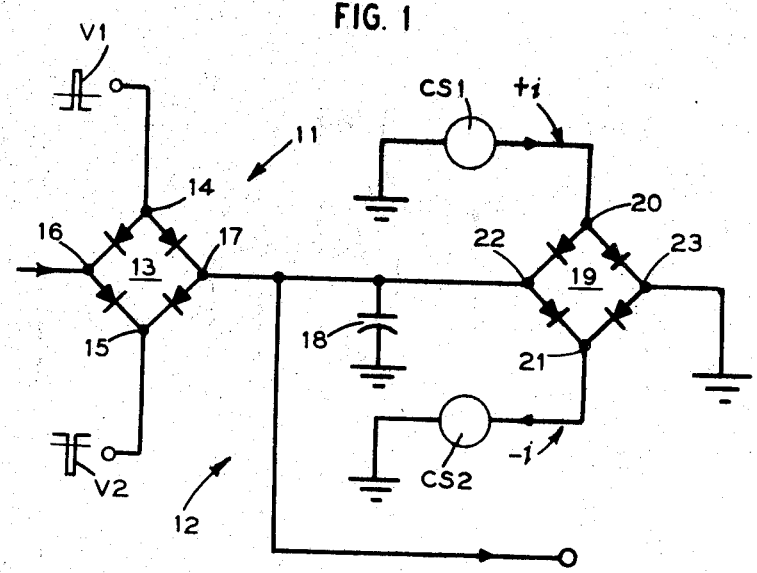
FIG. 1 is a circuit diagram of one form of that part of the meter which samples an input voltage signal and which produces a series of pulses whose heights and lengths are both proportional to the instantaneous values of the input voltage. The areas of these pulses are proportional to the squares of the value of the input voltage.

A schematic of the circuit of the sample 11 and the triangulator 12 is shown in detail in FIG. 1 to which reference is now directed.

The sampler 11 comprises a four-diode sampling bridge or gate 13 of conventional type. When equal amplitude voltage pulses $V_1$ and $V_2$ of opposite polarity are applied conincidentally to the two terminals of the bridge 14 and 15, the instantaneous voltage of the input terminal 16 received from the amplifier 10, FIG. 3, is gated through the bridge 13 to the output terminal 17 and, hence, to one plate of a capacitor 18 the other plate of which is connected to ground. The capacitor 18 is charged rapidly to the instantaneous amplitude of the input voltage $V_i$.

A second four-diode bridge 19 has constant currents $+i$ and $-i$ of equal magnitude but of opposite polarity applied to two bridge terminals 20 and 21. The currents $+i$ and $-i$ may be produced by conventional constant current generators designated $CS_1$ and $CS_2$, respectively. The capacitor 18 is connected to the input terminal 22 of the bridge 19 and discharges to ground potential at a constant rate through the output terminal 23 when the currents $+i$ and $-i$ are applied to the terminals 20 and 21, this discharge rate being determined by the difference in the forward voltages across the diodes forming the bridge 19.

Figure 3:
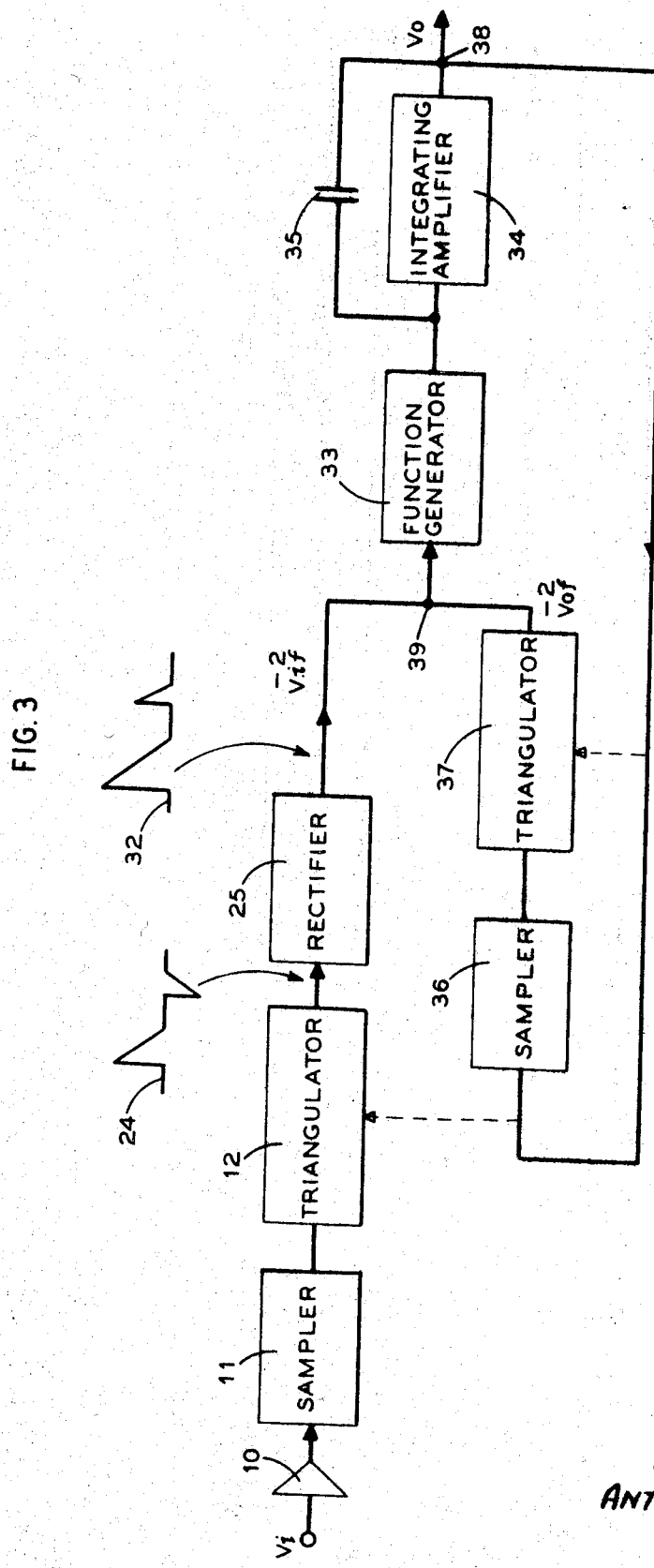
FIG. 3 is a block diagram of a first embodiment of a circuit according to the invention.

The voltage output is taken from across the capacitor 18 and is a waveform 24, FIG. 3, consisting of a series of triangular pulses of uniform slope having areas proportional to the squares of amplitude of the instantaneous voltages of the input and of the same polarity as these instantaneous input voltages.

A typical value of the sampling frequency is on the order of kilocycles per second, and it may be larger or smaller than the freqency of the input waveform $V_i$ providing only that the duration of the pulses $V_1$ and $V_2$ applied to the sample 11 are considerably less than the duration of the inputwaveform $V_i$. For example, for an input of frequency 100 megacycles per second, the maximum duration of the pulses $V_1$ and $V_2$ would have to be approximately one nanosecond ($10^{-9}$ sec.).

Figure 2:
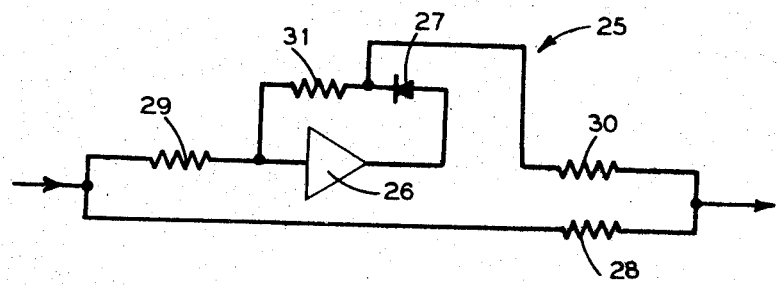
FIG. 2 is a circuit diagram of one form of full wave rectifier which may be used in some of the embodiments of the invention.

The voltage signal 24 produced by the triangulator 12 is then supplied to a full wave rectilinear amplifier rectifier 25. A detailed circuit of a preferred form of rectifier is shown in FIG. 2. Referring now to this figure, the rectifier 25 comprises an amplifier 26 and a diode 27 connected in series and a resistance 28 which shunts the amplifier 26 and the diode 27.

The shunt resistance 28 transmits both positive and negative pulses. The amplifier 26 is connected so as to invert the pulses received from the resistor 29 and the diode 27 only transmits the positive parts of the output of the amplifier 26, that is, the originally negative pulses. By means of series resistances 29 and 30 and a feedback resistance 31, The conductance of the rectifier is made twice the conductance of the shunt resistance 28. The voltage output 32, FIG. 3, of the rectifier 25 thus consists of a series of pulses of the same shape as the input puses 24 but which are now of the same polarity. The area of each pulse forming the voltage output 32, therefore, is still proportional to the square of the amplitude of the instantatneous input voltage $V_i$ to which it corresponds. The mean area beneath the waveform is, therefore, proportional to the mean square voltage and to the frequency of sampling, $\overline{V_i^2}f$, providing that the sampling frequency is incoherent with respect to the frequency of the input voltage $V_i$. To ensure this incoherence, the sampling frequency is varied over a small range.

The mean square voltage is measured by dividing the height of the waveform by the time which has elapsed since the beginning of the measurement in a function generator 33, which may be of a type such as described in detail in British patent specification No. 1,050,145, and then integrating by means of an integrating amplifier 34 of a conventional type. Feedback capacitor 35 of the integrating amplifier 34 has a value of capacitance such as to provide a steady output voltage $V_o$ at output terminal 38 even at low frequencies. The output voltage which appears at output terminal 38 may be measured by a conventional D.C. voltmeter, not shown.

The output voltage $V_o$ in this arrangement would be proportional to $\overline{V_i^2}f$. However, the sampling frequency, $f$, is varied during the measurement to ensure incoherence between that frequency and the frequency of the input voltage which is being measured. Alternatively, the sample frequencies may be made random by other means, such as deriving the pulses from the zero crossings of a random waveform.

The frequency dependence is removed by feeding back part of the output voltage, that is, $V_o$ received at the output terminal 38 through a feedback loop including a second sampler 36, which is essentially identical to the sampler 11, and a second triangulator 37 which is essentially identical to the triangulator 12. The output voltage of this second triangulator 37 is added to the output of the rectifier 25 at terminal 39. For the same reasons set forth in describing the operation of the triangulator 12, the output of the triangulator 37 will be proportional to $\overline{V_o^2}f$, where $f$ is the sampling frequency which is made the same sampling or gating frequency as that of the first sampler 11, FIG. 1, by supplying both samplers 11 and 36 with the same sampling pulses $V_1$ and $V_2$.

Providing that the integrating amplifier 34 has a high gain and the feedback voltage is inverted, then the sum of the voltage outputs from the rectifier 25 and the feedback loop will be almost zero in which case the output voltage $V_o$ received by the terminal 38 is proportional to the R.M.S. input voltage $V_i$, that is, $$\overline{V_o^2}f + \overline{V_i^2}f = 0$$

$$\therefore V_o = -(\overline{V_i^2})^{1/2}$$

The output voltage $V_o$ is now independent of the sampling frequency. Part of this output voltage $V_o$ is also fed back to the constant current generators $CS_1$ and $CS_2$, FIG. 1, of the triangulator 12, and to corresponding constant current generators, not shown, of the triangulator 37. This portion of the voltage $V_o$ when applied to the constant current generators establishes the magnitude of the currents $+i$ and $-i$ and, hence, the rate of discharge of the capacitor 18 of the triangulator 12 and the rate of discharge of the corresponding capacitor, not shown, of the triangulator 37 such that the rate of discharge of these capacitors is proportional to the output voltage $V_o$.

The slopes of the pulses of the waveforms 24 produced by the triangulators 12 and 37 are now proportional to the output voltage $V_o$ and the areas of these pulses are inversely proportional to the output voltage $V_o$. In which case, $$\frac{V_o^2 f}{V_o} + \frac{\overline{V_i^2} f}{V_o} = 0$$

and $$V_o = -(\overline{V_i^2})^{\frac{1}{2}}$$

The variations in current during the settling down time of $V_o$ corresponds again to an R.M.S. value. The unbalance current fed to the input of the integrating amplifier 34 is now a linear rather than parabolic function, reducing the settling down time of this amplifier.

To measure the mean square input voltage $\overline{V_i^2}$, the rate of discharge of the capacitor, not shown, in the second triangulator 37 (corresponding to the capacitor 18) is made proportional to $V_o$ in the manner described above but the rate of discharge of the capacitor 18 of the first triangulator 12 is kept constant. In this way, the output of the rectifier 25 will be $\overline{V_i^2} f$ and the feedback signal will be $V_o f$ so that the output voltage is $V_o = \overline{V_i^2}$.

Figure 4:
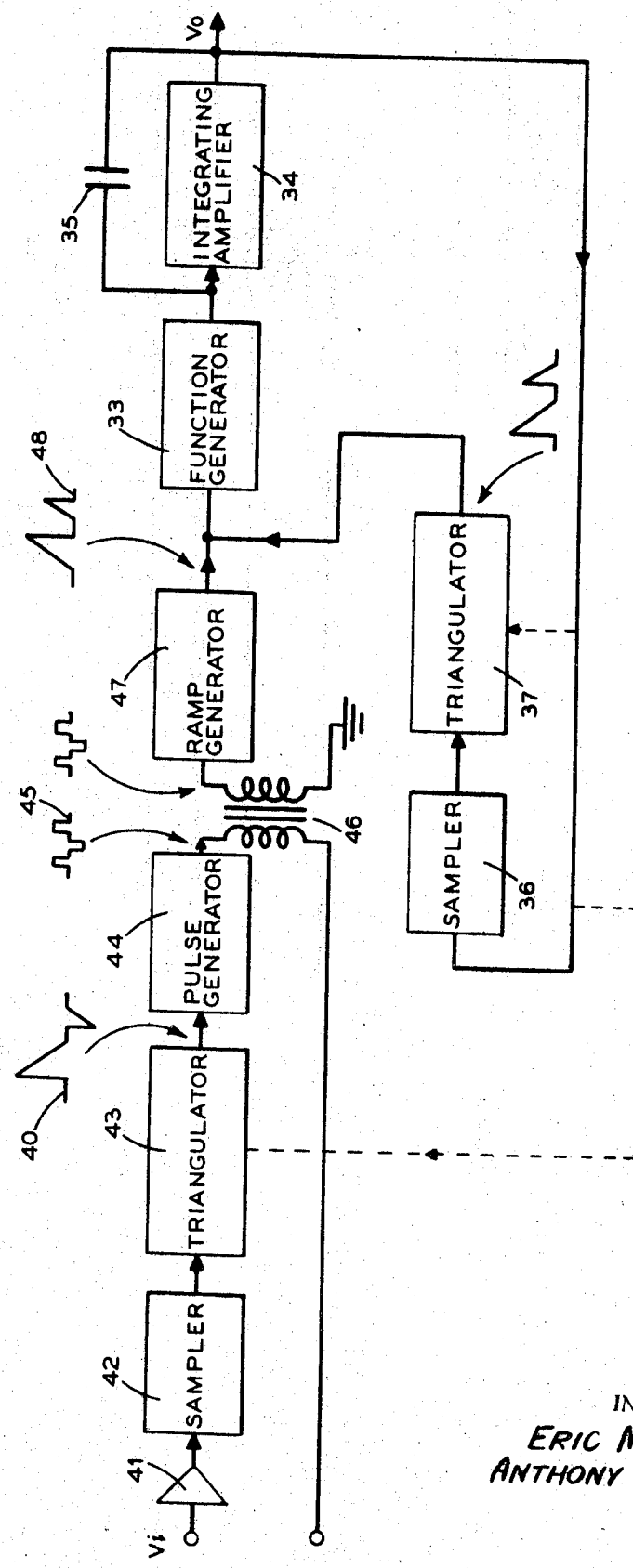
FIG. 4 is a block diagram of a second embodiment of a circuit according to the invention.

A second embodiment of the invention will now be described with reference to FIG. 4, wherein like numbers in FIG. 4 refer to like elements in FIG. 3.

In this embodiment of the invention, triangular pulses 40 corresponding to instantaneous values of the input voltage $V_i$ are formed in the same way as in the first embodiment. However, the amplifier 41, sampler 42, and the triangulator 43, have a low capacity with respect to ground.

The triangular pulses 40 are supplied to the input of a pulse generator 44, the output of which is a pulsed signal 45, the leading edge of a triangular pulse 40 generating a positive pulse at the output of the pulse generator 44 and the trailing edge of the triangular pulse generating a negative pulse. The intervals between the leading edges of successive positive and negative pulses forming the pulse signal 45 are thus proportional to the lengths of the trailing edges of the triangular pulses and, hence, to the corresponding amplitude of instantaneous input voltage $V_i$. The pulses are transmitted from the isolated section of the meter, through a low capacity transformer 46 to the grounded section and is supplied to the input of a ramp generator 47. The output of the ramp generator is a signal formed of triangular pulses 48 having the same positive polarity.

A positive input pulse to the ramp generator 47 initiates the generation of the hypotenuse of the triangle and a negative pulse causes the perpendicular of the triangle to be described. The areas of the triangular pulses of the output of the ramp generator 47 will thus be proportional to the areas of the corresponding pulses produced as the output of the triangulator 43, but their hypotenuses will now lead their perpendiculars. Since the output signal comprises pulses of the same polarity rectification is not required and the output is processed in the same manner as the output of the rectifier 25 in the first embodiment.

While there has been described what is at present considered to be a preferred embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. A voltmeter for measuring the means square voltage of a signal comprising: first voltage sampling means for sampling the instantaneous voltage of the signal to be measured at discrete intervals of time; waveform producing means coupled to said first voltage sampling means for producing a series of signals having heights and lengths proportional to the magnitude of said instantaneous voltage sampled by said voltage sampling means, waveform producing means including, signal storage means and means for applying said instantaneous voltage to said storage means; first discharge means for discharging said storage means at a constant rate; means coupled to the waveform producing means for rectifying the signals received therefrom, means for supplying the voltage on said storage means to said rectifying means, integrating means coupled to the waveform producing means for integrating said waveform and providing a constant D.C. voltage output, said integrating means including, an operational amplifier of high negative gain and further comprising, second voltage sampling means coupled to sample the output of said integrating means at discrete times and at the same mean frequency as said first voltage sampling means; and feedback means coupled to said second sampling means for feeding back to said integrating means a series of feedback signals proportional in both height and length to the sampled output voltage of said integrating means.

2. A voltmeter according to claim 1 in wihch said feedback means comprises: a feedback capacitor, means for applying the voltage sampled by said second voltage sampling means to said feedback capacitor, feedback discharge means for discharging said feedback capacitor at a constant rate, and means for deriving said series of feedback signals from the voltage appearing on said capacitor.

3. A voltmeter according to claim 2 wherein said means coupled to said feedback voltage sampling means feeds back to said integrating means a series of feedback signals having pulse shapes of right-angled triangles and heights and slopes proportional to the magnitude of the sampled output voltage received from said integrating means.

4. A voltmeter for measuring the root means square voltage of a signal comprising: a voltmeter according to claim 3 including means for feeding the output voltage to said first discharge means for varying the rate of discharge of said first capacitor so as to be proportional to the output voltage.

5. A voltmeter according to claim 1 including means for varying the intervals between the discrete times of sampling of said first voltage sampling means.

6. A voltmeter according to claim 1 including means for randomly determining the discrete times of sampling of said first voltage sampling means.

7. A voltmeter according to claim 1 in which said rectifying means includes, pulse generating means coupled to said signal producing means for generating pulses of opposite polarities corresponding to the leading and trailing edges, respectively, of each signal forming the series of signals, and a ramp generator coupled to said pulse generating means for generating a series of triangular pulses having leading and trailing edges defined by the leading edges of the pulses of opposite polarity.

8. A voltmeter according to claim 7 including an isolating transformer coupled to said pulse generating means and passing the generated pulses to said ramp generator.

9. A voltmeter according to claim 4 in which said rectifying means includes pulse generating means coupled to said signal producing means for generating pulses of opposite polarities corresponding to the leading and trailing edges, respectively, of each signal forming the series of signals, an isolating transformer coupled to said pulse generating means, and a ramp generator coupled to said isolating transformer for generating a series of unidirectional triangular pulses whose leading and trailing edges are defined by the leading edges of the pulses of opposite polarities.

(References on following page)

References Cited

UNITED STATES PATENTS

| | | | |
|---|---|---|---|
| 2,710,397 | 6/1955 | Foster | 324—99 |
| 2,901,700 | 8/1959 | Bolie | 324—95 |
| 3,048,778 | 8/1962 | Rumpel | 324—106 |
| 3,113,274 | 12/1963 | Utt | 328—144 |
| 2,591,738 | 4/1952 | Spencer | 324—102 |
| 2,880,935 | 4/1959 | Johnson | 235—194 |
| 3,159,787 | 12/1964 | Sexton et al. | 324—132X |
| 3,248,655 | 4/1966 | Kobbe et al. | 328—186X |
| 3,064,192 | 11/1962 | Schwarzlander | 324—118 |
| 3,229,212 | 1/1966 | Rogers | 328—15 |

OTHER REFERENCES

Frye et al.: Random Sampling Oscillography, IEEE Transactions on Instrumentation and Measurment, March 1964, pp. 8–13.

Lion et al: Square-Law Circuit, Electronics, September 1955, pp. 192, 194, 196, 198, 200, and 202.

RUDOLPH V. ROLINEC, Primary Examiner

E. F. KARLSEN, Assistant Examiner

U.S. Cl. X.R.

324—99, 132; 328—144